Dec. 31, 1963    J. STORY    3,115,721
DUCK DECOY
Filed April 26, 1962
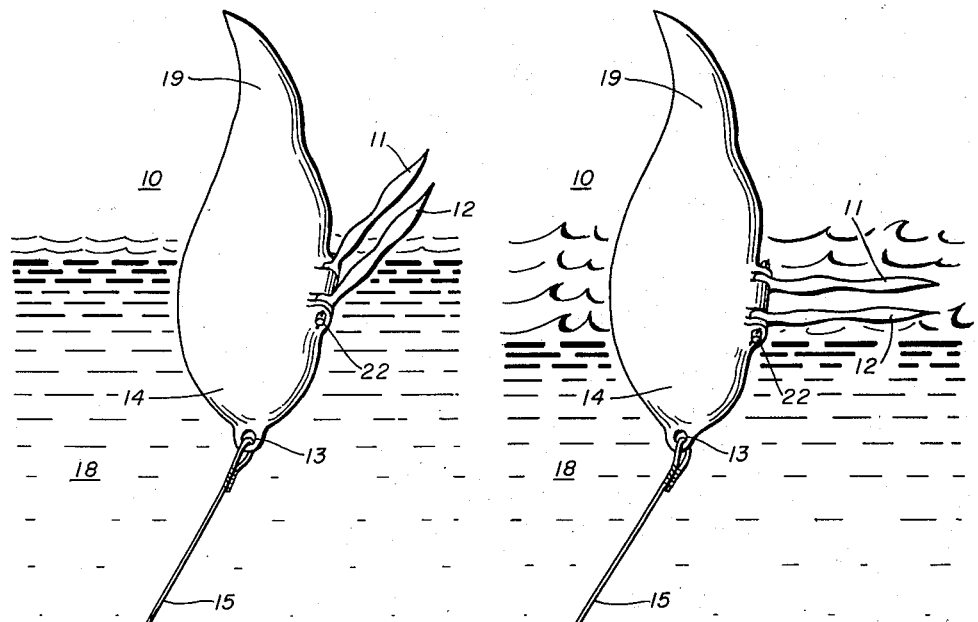
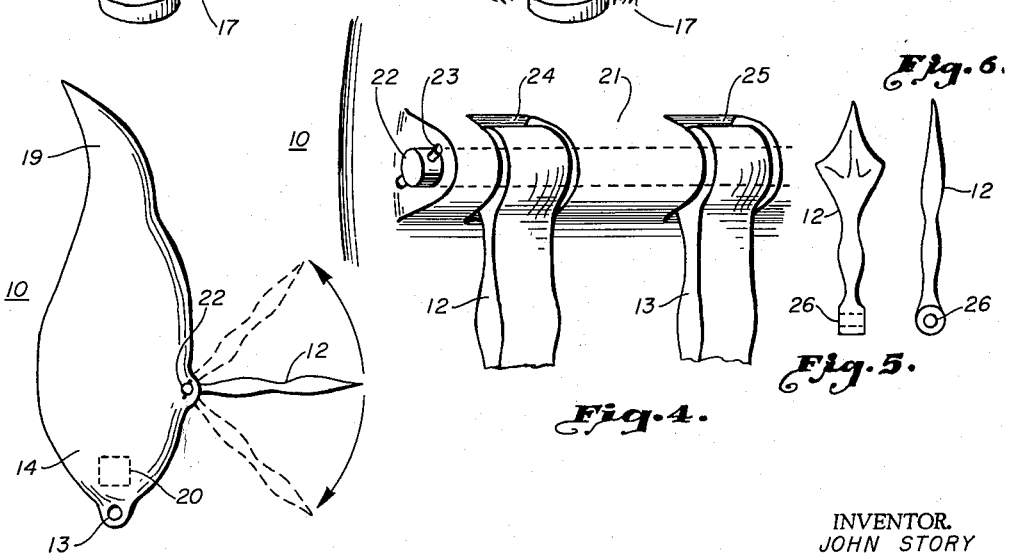
INVENTOR.
JOHN STORY
BY Arthur L. Wade
ATTORNEY

United States Patent Office 3,115,721
Patented Dec. 31, 1963

3,115,721
DUCK DECOY
John Story, 3305½ S. Peoria, Tulsa, Okla.
Filed Apr. 26, 1962, Ser. No. 190,352
7 Claims. (Cl. 43—3)

The present invention relates to duck decoys which simulate the feeding position of actual ducks in water. More specifically, the invention relates to the feet members of a feeding duck decoy in water.

I have observed the habits of ducks for many years. Further, I have formulated the reaction of game ducks to present systems and apparatus used by hunters. As a result of my study of the problem of deception of game ducks, I have discovered a simple combination of visual stimuli which never fail to attract these ducks.

The principal motivation of ducks in flight toward folding their wings and landing on water at a particular location is the constant quest for food. If other ducks seem to be reaping a harvest of food at a particular location, the flying duck will cut his wings and join the feast. I have channeled this basic motivation in the duck by providing a duck decoy in the feeding position of a duck.

There is a definite problem in providing a duck decoy in the feeding position. The body of the decoy can be comparatively crude in simulation of the actual body of a duck. However, the feet members of such decoy must meet certain minimum requirements as to color and as to their animation. Further, to meet the requirements of service, the body, feet members and the attachment structure between body and feet members must have the form and material which will effectively resist deterioration by the outdoor elements over long periods of exposure.

A principal object of my invention is to provide a duck decoy with a permanent feeding position in the water.

Another object is to provide feet members for a duck decoy with a color which will effectively deceive actual ducks.

Another object is to provide a foot member and mounting between the foot member and body with a form and material which is extremely simple and resistant to deterioration.

Still another object of my invention is to provide a foot member and mounting which will result in an action of the foot member in water so near that of an actual duck as to nullify any suspicions of a game duck.

The present invention contemplates a buoyant, or floatable, simulated duck body in the feeding position of an actual duck in the water. A weight is provided in the simulated duck body near the head end so as to maintain the tail end up, in the feeding position, while the decoy is in the water. The decoy is then provided with a submerged tether from its head end to obviate the decoy drifting beyond the distance defined by the length of the tether.

My invention further contemplates feet members for the decoy which are colored so as to closely resemble the actual color of duck feet.

My invention further contemplates the body of the decoy, the feet members for the body and the mounting structure for the feet members on the body being of plastic, or some material which resists corrosion or deterioration when exposed to the outdoor elements over long periods of time. The specific structure is so simple in form and operation that a minimum of time is consumed in replacing broken feet members.

My invention further contemplates a foot member which is itself floatable, or buoyant. This feature, together with a mounting on the body which provides free pivoting in the vertical planes, gives a surprisingly lifelike action to the feet from the forces of waves.

Other objects, advantages and embodiments of the present invention will become readily apparent from the following detailed description of the preferred embodiment of the invention with specific references to the accompanying drawings in which;

FIG. 1 is an elevation view showing the preferred embodiment of the invention tethered in fairly calm water;

FIG. 2 is a view similar to FIG. 1 of the preferred embodiment tethered in somewhat rough water;

FIG. 3 is a side elevation of the preferred embodiment showing the pivoting range of the feet members attached to the body;

FIG. 4 is an isometric view of the structure by which the feet members are attached to the body;

FIG. 5 is a front elevation of one of the feet members; and

FIG. 6 is a side elevation of the foot member of FIG. 5.

Referring specifically to FIG. 1 and FIG. 2, I have shown the preferred embodiment of my invention functioning under two conditions of use. In FIG. 1 the decoy in which my invention is embodied is shown floating in relatively calm water. In FIG. 2 the same decoy is shown floating in relatively rough water. While operating under both conditions, the decoy maintains itself in the underwater feeding position which an actual duck assumes. While in this feeding position, motions are imparted to the leg members by the action of the water waves which closely resemble the leg motions of an actual duck under both conditions.

The decoy in which I have embodied my invention generally includes two portions. First portion body 10 is formed of buoyant material and given the general shape of the body of an actual duck. Leg members 11 and 12 are attached, as the second portion, at a location on the body 10 corresponding closely to the actual location of the junction of the legs of an actual duck to its body. Obviously the general form, or shape, of these two portions should correspond closely to the actual form of corresponding portions of an actual duck. In addition to this similarity, my decoy has at least three other features which singly, and in various combinations, render my decoy far more effective than other duck decoys.

Before taking up the three specific features of novelty in my decoy, it is to be noted that the decoy is restrained from drifting beyond a predetermined distance from an assigned station by a tether. Specifically, body 10 has a hole 13 provided at head end 14 and line 15 tied by one end through the hole 13. The other end of line 15 is tied to an anchor 16 which is on the bottom 17 beneath water 18. Line 15 is given the length which enables the decoy body to float on the surface of water 18 in all degrees of roughness without being pulled under as the waves vary the height of the surface of the water 18 from the bottom 17.

Also, referring to FIG. 3, I have attached a weight 20 near hole 13 to keep body 10 floating with tail 19 elevated properly. Weight 20 can be a body of lead, or some other metal heavy and large enough to maintain head end 14 down and tail 19 up. The weight may be inserted within body 10 or fastened to its outside. The concept is to locate it as shown, a substantial distance below the surface of the water, attached in some manner to body 10.

Feeding Position

FIGS. 1 and 2 show my decoy weighted and tethered in the feeding position of an actual duck as such duck would search for food beneath the surface of the body of water 18. Body 10 has head portion 14 submerged beneath the surface. Tail portion 19 is pointing straight up in the air. Feet members 11 and 12 are attached to body 10 near the waterline on body 10; actually the point of attachment is slightly beneath the waterline when the decoy is floating in relatively calm water as shown in FIG. 1.

A duck flying over my decoy will be deceived into thinking my decoy is an actual duck engaged in underwater feeding. I have observed that a duck is not capable of reasoning that my decoy does not come up for air and is therefore not a real duck. Ducks are not smart enough to figure out this fact. Therefore, it is not necessary to provide a head portion on body 10 and to provide apparatus with which to lift the head portion out of the water from time to time. The result is that my decoy can be of very simple construction without a head portion, needing only body 10 and feet members 11 and 12 to function efficiently.

Color of Feet Members

Ducks are influenced by the color of feet members of decoys. I am aware of theories and discussions on the ability of birds, particularly ducks, to distinguish colors. I can not deal with this question in great detail, but I have observed that my decoys are more attractive to ducks when their feet members are colored a shade which closely approach the natural color of the legs and feet of ducks.

The natural color of most duck feet and legs is a distinctive shade of orange. My invention includes the concept of carefully coloring leg members 11 and 12 this natural shade of orange. This color, together with the feeding position of body 10, results in a marked, and surprising, cumulative attraction for game ducks which will efficiently decoy them into landing near the station at which I place my decoy.

Action of the Feet and Leg Members

When my decoy is floated at its assigned station, and its feet and leg members given the natural color discussed supra, it becomes important that these members move to complete the illustion that the decoy is a live duck busily engaged in underwater feeding. My invention provides this movement with structure which is very simple yet quite unique among decoys.

First, consider the simplicity of my foot and leg structure per se. The structure is in one piece, moulded, or cut, to resemble the form of an outstretched leg and foot of an actual duck. This extended form for the leg and foot is disclosed completely when the drawings of FIGS. 1, 2, 3 and 5 are considered together. When pivoted from body 10 under the teachings of my invention, this member will move under the force of waves of water in which the decoy floats, closely resembling the actual leg action of an actual duck. At least the resemblance will be close enough to fool the observing power and intelligence of a duck.

The pivot structure provided by my invention enables each foot and leg member to pivot from its place of attachment to body 10 in a vertical plane when the body 10 is floating in water 18. FIG. 3 discloses the wide angle of pivoting provided for foot and leg member 12.

My specific pivot structure which I have provided for my preferred embodiment is disclosed in FIG. 4. In this drawing I have given a suggestion of the outline of body 10 near the location of the pivot structure. At this location I indicate the formation of a raised portion, or boss, 21. A hole is formed through this boss 21 and a pin 22 is extended through the hole, capturing foot and leg members within recesses 24 and 25. Cotter pins 23 are then fastened to each end of pin 22, retaining pin, boss and foot and leg members into an assembly.

The scope of my invention includes other pivot arrangements between the body 10 and foot and leg members. I am not limited to the precise form of pivot structure disclosed in these drawings. The concept includes any pivot structure which permits the leg members to pivot through an angle of at least 90 degrees in their vertical planes. Given this range of pivoting, the foot and leg member will move so as to resemble closely the motion of the foot and leg member of an actual duck. Able to freely pivot, the foot and leg member needs to have only the force of the waves applied to it to complete the illusion.

FIG. 5 and FIG. 6 disclose one of the foot and leg members. Each of the foot and leg members pivots independently on pin 22. When buoyant, floating on the surface of water 18, the foot and leg member rises and falls with whatever waves are on the surface of water 18. I have observed there is almost always some wave action on the surface of ponds in the fall of the year when ducks are hunted. My decoy takes advantage of this force to actuate the foot and leg members as the body 10 floats at its assigned station.

It is possible to make the foot and leg members of material which is solid, yet lighter than water. Wood first comes to mind. Yet, I have found that wood will water soak too quickly to be preferred for this construction. Even several coats of paint do not seem to slow down this soaking process satisfactorily. There may be many materials lighter than water which are satisfactory for this purpose. My invention certainly includes all satisfactory material within its scope. Properly shaped, these materials will have a hole 26 formed at the end to receive pin 22 therethrough. The foot and leg member will then pivot independently about pin 22 within recess 24.

My invention finds its preferred embodiment in some sort of plastic material. The plastic material can be readily moulded with air chamber to make the complete structure buoyant in water. There are many plastics which can be moulded into this desired form and yet which are tough and weather resistant. Not only can the foot and leg member be made of such material, but pin 22 and cotter pin 23 can be made of the same plastic. If the complete assembly is made up in this manner, my decoy can be left out at its station over long periods of time without danger of deterioration from either the water in which the decoy floats or the other elements of the outdoors.

Summation

The three basic elements of my invention for a duck decoy have been disclosed as the feeding position, the color provided for the foot and leg members and the pivoting and buoyancy of the foot and leg members. Singly, and in their various combinations, these features produce the new result.

The various structures are readily assembled manually. They can be packaged for sale and transport with great compactness. Should one of the foot and leg members be broken, it can be readily replaced because of the extremely simple arrangement I have provided for the pivot.

When a duck flies over a group of conventional decoys among which a few of my new decoys have been scattered, the results are sure and positive. The duck will land on the water. If he lands a distance from the decoys he will swim toward them upon seeing my feeding decoys. I have conducted many experiments with groups of decoys among which I have placed my new decoy and with groups without my new decoy. The three features of my invention have proven effective again and again to be the largest factor bringing ducks within gun range.

From the foregoing it will be seen that this invention is one well adapted to attain all the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown The invention having been described, what is claimed is:

1. A duck decoy including,
    a body of material buoyant in water and having a head portion and a tail portion with general shapes and color in the tail portion to simulate an actual duck,
    a weight attached to the head portion of the body a substantial distance below the surface of the water, to cause the body to float with the tail portion pointing upward,
    feet members of buoyant construction pivotally connected to the body to move with wave action and having a color closely resembling the natural color of the legs of an actual duck,
    and means for tethering the body from the head end to an underwater station to establish the limit the decoy can drift from the station.

2. A duck decoy including,
    a body of material buoyant in water and having a head portion and a tail portion with general shapes to simulate those of an actual duck, particularly the tail portion,
    a weight attached to the head portion of the body a substantial distance below the surface of the water, to cause the body to float with the tail portion pointing upward,
    pin of non-corrosive material mounted on the body at the approximate position real feet are attached to an actual duck body,
    feet members of buoyant construction and non-corrosive material and natural color having holes through which the pin extends to give free pivoting to the feet members in a vertical direction as the feet move with wave action,
    retaining members of non-corrosive material on the pin for retaining the feet members on the pin,
    and means for tethering the body from the head portion to an underwater station to establish the limit the decoy can drift from the station.

3. A duck decoy having,
    a body of material buoyant in water and having a head portion and a tail portion with general shapes and color in the tail portion to simulate the body of an actual duck,
    a weight attached to the head portion a substantial distance below the surface of the water so as to cause the body to float with the tail portion in the air to simulate the underwater feeding position of a duck,
    a tether attached to the head end to fix the distance the body can drift in the water,
    and feet members of buoyant material colored to closely resemble the actual color of the feet and legs of a duck and attached to the body so as to pivot in vertical planes under the force of waves of the water in which the decoy is set to float.

4. A duck decoy including,
    a body portion of material buoyant in water and having a head portion and a tail portion given general shapes to resemble the shapes of the head portion and tail portion of an actual duck body,
    a weight mounted within the body a substantial distance below the water surface to cause the body portion to float in a body of water with the tail portion of the body extended up in the air in simulation of the underwater feeding position of a duck,
    foot and leg members constructed to be buoyant in water and colored to closely resemble the natural color of the foot and leg members of an actual duck,
    and pivot structure for the foot and leg members on the body portion constructed and arranged to permit each foot and leg member to move independently of the other foot and leg member under the force of wave actions on the surface of the water in which the decoy floats.

5. A duck decoy including,
    a body portion having a construction and of a material to be buoyant in water and having a head portion and a tail portion which are given the general shapes so as to resemble the head portion and tail portion of an actual duck body,
    a weight attached to the head portion in such manner as to cause the body portion to float in the underwater feeding position of an actual duck,
    a foot and leg member in the shape of an extended foot and leg of an actual duck and having a construction and of a material to be buoyant in water and having a hole formed at the end to be attached to the body portion,
    a boss formed on the body portion at a position corresponding to the position at which the leg of an actual duck is attached to the body of an actual duck and having,
    a recess shaped to receive the end of the foot and leg member which has the hole formed therein and a hole intersecting the recess,
    a pin placed through the holes of the boss and the foot and leg member to capture the foot and leg member within the recess in such manner as to provide for the foot and leg member to pivot in a vertical plane through at least a 90 degree angle,
    and a cotter pin mounted on the pivot pin to maintain the pivot pin and foot and leg member and body in an assembly.

6. The decoy of claim 5 in which the foot and leg member is colored the natural shade of orange of actual duck legs and feet.

7. The decoy of claim 6 in which the foot and leg member and pivot pin and cotter pin are all made of a plastic material which will not rust nor corrode.

References Cited in the file of this patent

UNITED STATES PATENTS

| | | |
|---|---|---|
| 2,457,295 | Woodhead | Dec. 28, 1948 |
| 2,504,229 | Sinclair | Apr. 18, 1950 |
| 2,903,812 | Lewis | Sept. 15, 1959 |
| 3,059,368 | Wortman | Oct. 23, 1962 |